UNITED STATES PATENT OFFICE.

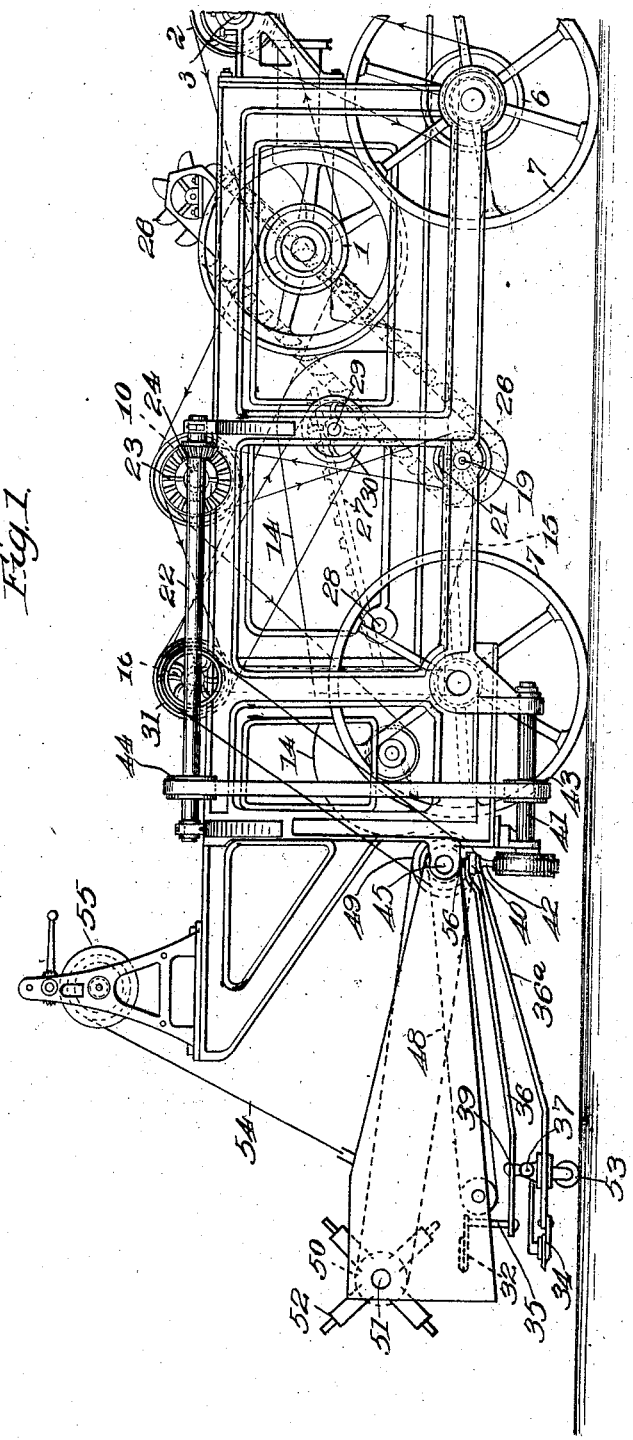

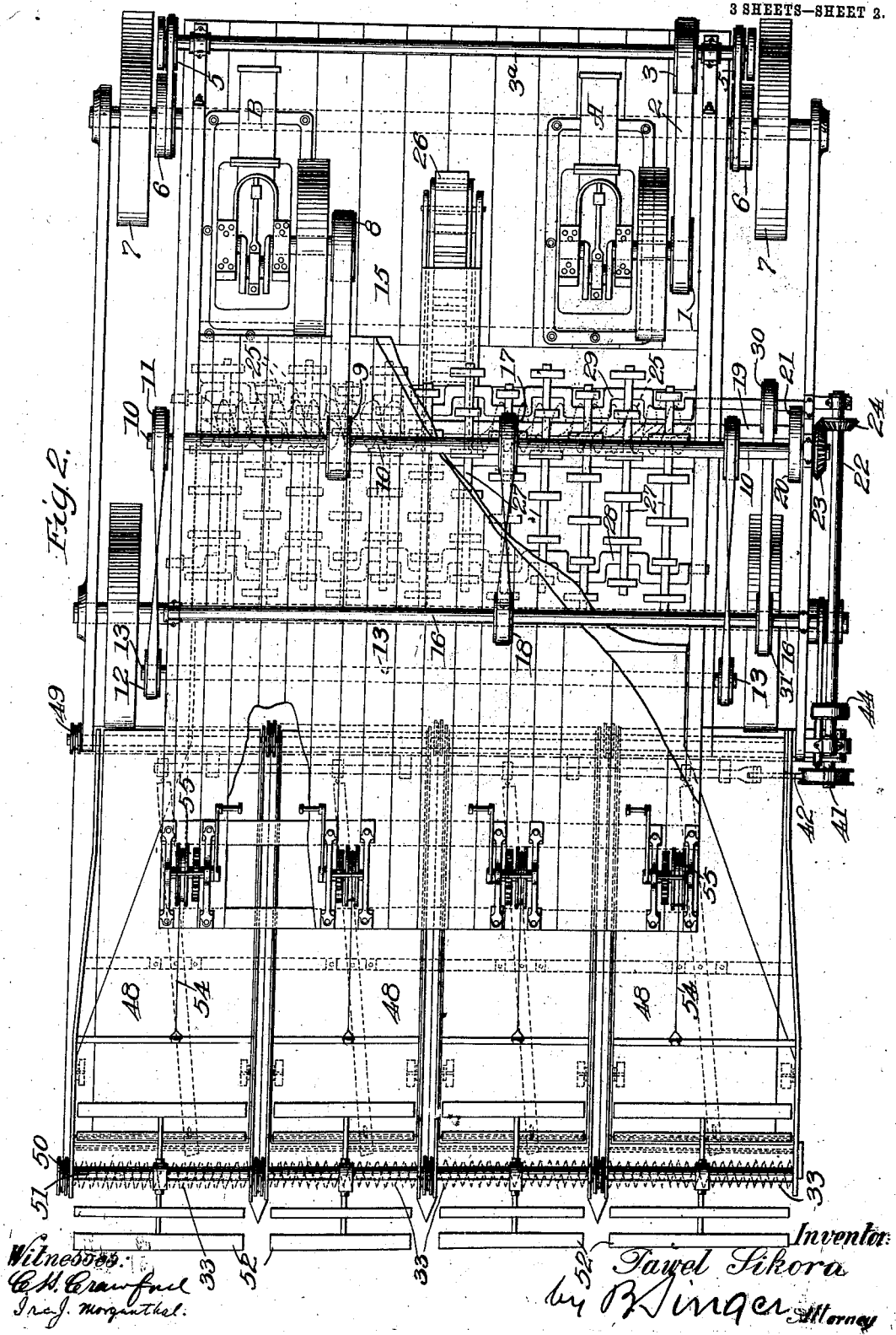

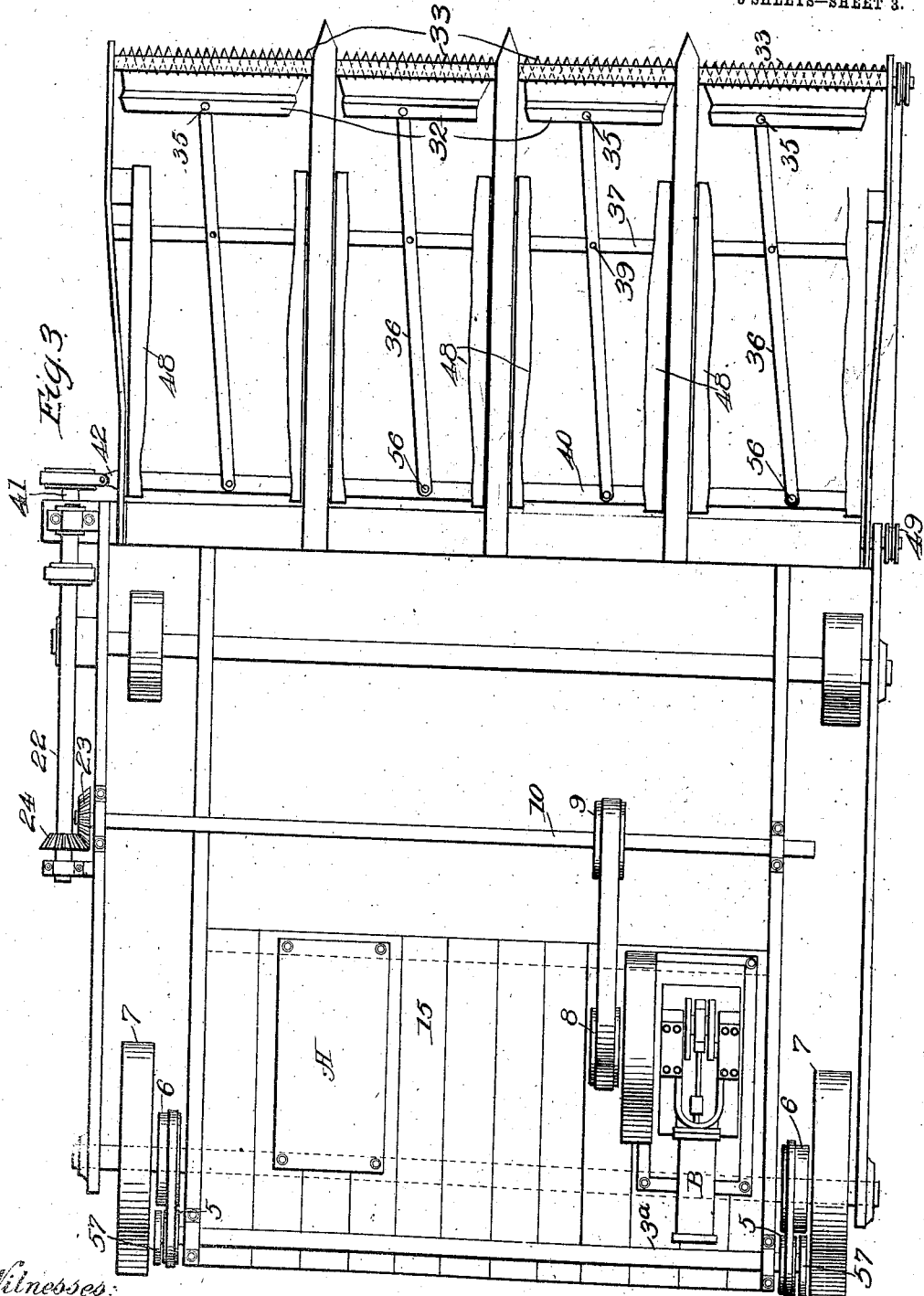

PAWEL SIKORA, OF PUSTKOW, AUSTRIA-HUNGARY.

HEADER AND THRESHER.

No. 872,465.

Specification of Letters Patent.

Patented Dec. 3, 1907.

Application filed March 25, 1901. Serial No. 62,787.

*To all whom it may concern:*

Be it known that I, PAWEL SIKORA, a subject of the Emperor of Austria-Hungary, and resident of Pustkow, Austria-Hungary, have invented certain new and useful Improvements in Headers and Threshers, of which the following is a specification.

The object of my present invention is to provide an improved harvester, adapted to strip the heads from the stalks and at the same time thresh the heads and the invention consists of the construction and novel combination of parts hereinafter fully described and claimed.

In the accompanying drawings: Figure 1 is a side elevation of the improved harvester. Fig. 2 is a top plan view of the same. Fig. 3 is a detail view, partly diagrammatical showing the cutter bar and actuating mechanism.

Referring to the drawings, A and B are two motors serving to operate the machine, that is: I provide a motor for moving the machine forward on the ground, and another motor for operating the different mechanical parts of the machine. Power is transmitted from one motor, by means of a wheel 1 and belt 2, to a wheel 3 mounted on a shaft 3ª. On the ends of the latter are mounted other wheels 5 adapted to be clutched to and disengaged from said shaft when desired. Said wheels 5 are suitably connected to wheels 6 mounted on the axle of the rear supporting wheels 7, whereby the machine is moved forward when the motor is in operation.

The mechanism for stripping off and threshing the heads is operated by the second motor B the movements of which are transmitted to the main-shaft 10 by means of pulleys 8 and 9 and a belt connecting the latter. A threshing drum shaft 13 of a threshing drum is belted to the main shaft 10, pulleys 11 and 12 being provided for said shafts 10 and 13. As the construction of the latter is well-known the same is only indicated on the drawings by the shaft 13 for the sake of clearness.

The threshing drum is covered by a metal plate 14 extending over the shaking mechanism to the floor 15.

The main shaft 10 actuates the shaft 16 by means of pulleys 17, 18; the shaft 19 by means of pulleys 20, 21; and the shaft 22 by means of gear-wheels 23, 24. The shaft 19 carries a screw conveyer 25, the pitch of the blades of which are opposite for the purpose of conveying the threshed heads towards the middle of the machine, whereby the heads are received by a bucket elevator 26 bringing them into bags arranged under the upper end of said elevator.

The shaking mechanism upon which the heads and grain are brought consists of wooden bars 27 to which are secured transverse cleats. The bars 27 are pivotally connected to the corresponding cranked parts of the shafts 28 and 29, so that they receive a shaking motion when the shaft 29 is rotated by the shaft 16 through the agency of pulleys 30 and 31.

The mowing or stripping device is constructed as follows:—Arranged at the front of the machine and end to end are a number of bars 32 which are provided with toothed cutters 33 which serve to cut off the heads. Arranged under the cutter bars 32 is a second set of bars 34 also provided with cutting teeth which serve to cut off the straw close to the ground. The upper cutters are reciprocated by means of levers 36 which are engaged at one end with bolts or pivots 35 on the cutters. These levers are pivoted at 39 to a cross bar 37, and at the opposite end are hinged or pivotally connected to a reciprocating bar 40, at 56. The lower set of cutter bars 34 are likewise reciprocated by means of levers 36ª which are pivoted to the cross bar 37 and are also suitably connected at the opposite ends with the bar 40. It will thus be seen that, as the bar 40 is reciprocated, the cutter bars are likewise given a reciprocating motion, one actuating bar thereby serving to move a plurality of cutter bars. The bar 40 is actuated by means of a connecting rod 42 yoked to an eccentric on the shaft 41 and by the rotation of the pulleys 43 and 44.

Extending around the shaft 45, actuated by means of pulleys 46 and 47, and the shaft 16, is an endless linen band 48 receiving the heads from the cutters 33 and bringing said heads to the threshing apparatus, while the straw cut off on the ground by the cutters 34 remains on the ground for drying purposes. The shaft 45 carries also pulleys 49 connected to corresponding pulleys 50 on the shafts 51. Each shaft 51 carries a reel 52, serving to bring the heads to the cutters 33 and upon the band 48. Each cutting device 34 is provided with rollers 53 supporting same on the ground. Each section of the cutters 33 and 34 may be separately raised by means of the cords 54 and the windlasses 55.

The operation is as follows:—When the machine is moved forward, the heads are brought to the cutters 33 by the reels 52, and cut or stripped off by said cutters, whereupon the heads are brought upon the endless bands 48 and thence to the threshing drum mounted on the shaft 13. When the heads are threshed, they are brought together with the grain upon the shaking device 27, through which the grain drops upon the floor 15 and is brought to the screw 25 which moves it to the middle of the machine, where it is received by the bucket-chain over the end of the shaking device upon the ground where they remain to be dried. At the same time, the straw is cut off at the ground by the cutters 34 and remains on the ground. The machine is moved forwards by keying the wheel 5 on the shaft 3 by means of the clutch 57.

Having fully described my invention, what I claim and desire to secure by Letters Patent is:—

1. The improved header comprising a number of section cutters 33 for stripping off the heads and cutters 34 for cutting off the stalks in each section, means for actuating said cutters, jagged reels for bringing the heads to the cutters, an endless band leading from said head cutters, a windlass and connections between the latter and these several sections, whereby said sections may be raised independently, and supporting rollers under the cutters 34, substantially as set forth.

2. In a header, the combination of sectional cutter bars arranged end to end each in an independent hinged frame, a reel over hanging each cutter bar, means for lifting the cutter bars independently of each other, and a conveying apron leading from each cutter bar.

In testimony whereof I have hereunto set my hand, in presence of two witnesses.

PAWEL SIKORA.

Witnesses:
 ALVESTO S. HOGUE,
 A. FUNK.